United States Patent
Armolavicius

(10) Patent No.: US 8,670,315 B1
(45) Date of Patent: Mar. 11, 2014

(54) METHOD AND APPARATUS FOR ESTIMATING END-TO-END PACKET DELAY

(75) Inventor: Romas Armolavicius, Stittsville (CA)

(73) Assignee: Rockstar Consortium US LP, Plano, TX (US)

( * ) Notice: Subject to any disclaimer, the term of this patent is extended or adjusted under 35 U.S.C. 154(b) by 2068 days.

(21) Appl. No.: 11/013,022

(22) Filed: Dec. 15, 2004

(51) Int. Cl.
*H04L 1/00* (2006.01)
*G01R 31/08* (2006.01)

(52) U.S. Cl.
USPC .............. 370/231; 370/252; 370/395.21

(58) Field of Classification Search
USPC ............. 370/229, 235, 238, 252, 395.21
See application file for complete search history.

(56) References Cited

U.S. PATENT DOCUMENTS

| | | | |
|---|---|---|---|
| 5,570,346 A * | 10/1996 | Shur | 370/231 |
| 2003/0072485 A1* | 4/2003 | Guerin et al. | 382/166 |
| 2003/0152028 A1* | 8/2003 | Raisanen et al. | 370/235 |
| 2004/0210655 A1* | 10/2004 | Martinot et al. | 709/224 |
| 2005/0025059 A1* | 2/2005 | Rajan et al. | 370/238 |

* cited by examiner

*Primary Examiner* — Yemane Mesfin
*Assistant Examiner* — Christine Duong
(74) *Attorney, Agent, or Firm* — Anderson Gorecki & Rouille LLP

(57) ABSTRACT

A method for estimating an end-to-end delay in a transmission network is described along with a number of embodiments. The method may use a variety of measured delay characteristics associated with domains spanning the network as inputs to a function which provides an estimation of delay. The function is not computationally complex, and thus accurate estimates of end-to-end delay may be obtained more quickly and therefore be made more useful in real-time network administration.

15 Claims, 5 Drawing Sheets

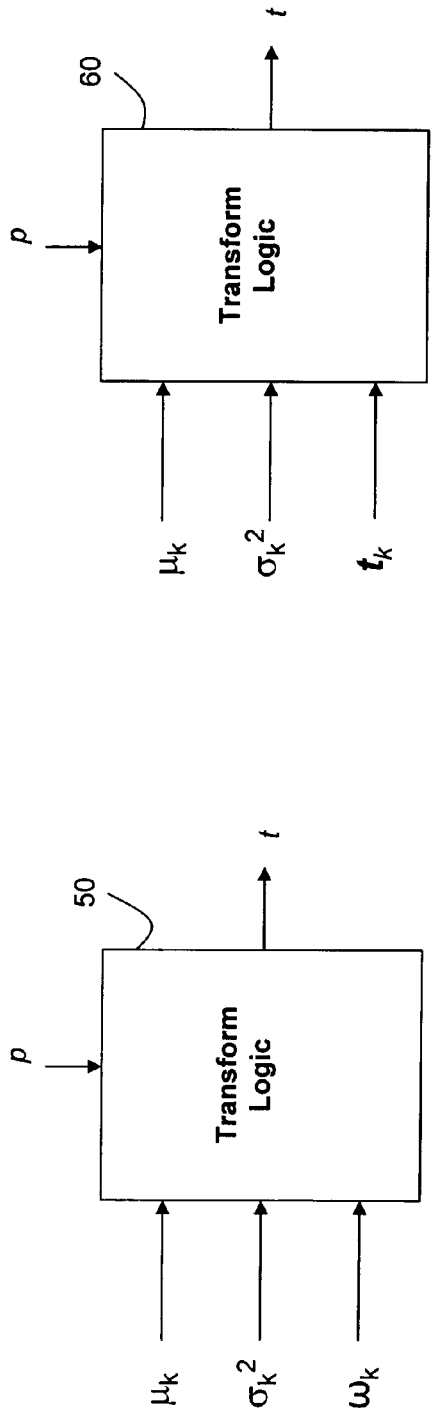
Figure 2A
Figure 2B
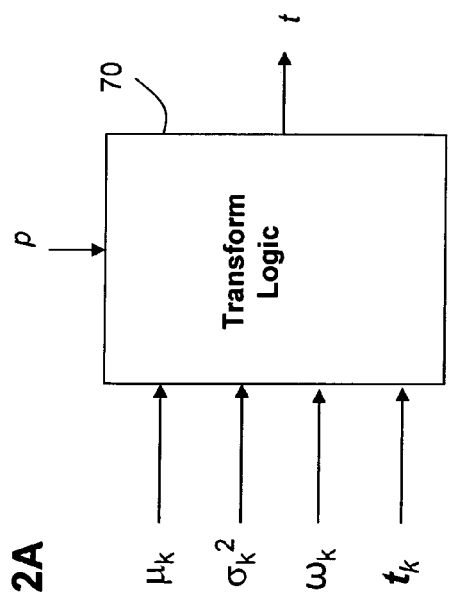
Figure 2C

METHOD AND APPARATUS FOR ESTIMATING END-TO-END PACKET DELAY

FIELD OF THE INVENTION

This invention relates generally to the field of network analysis and more particularly to a method and apparatus for estimating end-to-end packet delay and delay variation or jitter in a network. The most important applications of the method are to networks that comprise a number of component domains that the packets must traverse.

BACKGROUND OF THE INVENTION

As it is known in the art, each packet that is forwarded from a source to a destination experiences a transmission delay. The transmission delay is associated with both the route that the packet takes from the source to the destination and the delays associated with the devices that the packet encounters in transit. It is important to be able to estimate the delay for a variety of reasons. Network administrators may analyze delay data to support network planning, billing, performance monitoring and reporting, or to determine how to alter tunable network parameters to improve performance. An accurate estimate of the delay is particularly important for systems which stream real time data, such as voice and video. In such systems the source encoding process typically emits packets periodically and the destination decoding process expects to receive packets in the same periodic fashion in order to play them out properly. Jitter or variation in inter-packet timing at the receiver caused by variable transit delays must be removed by a jitter (removal) buffer. These buffers remove jitter by storing and delaying sufficient arriving packets so they can be played out periodically in the same fashion they were input to the network. The design and engineering of jitter buffers in particular and of the network in general require a good characterization of delay variation. In what follows "delay" will be a common term used to refer to either end-to-end packet transit delay or jitter (variation of inter-packet arrival delay) at the receiver.

Several problems arise when estimating network delay. One is the selection of the appropriate definition of delay. The definition employed here is the quantile, defined as follows: t is said to be the p-th quantile of a random variable T with distribution function F if F(t)=p for some probability p. Another problem is that the specific mathematical form of these distributions of delay for each component will in general not be known. Even if the delay distributions are known, whenever more than one network is traversed end-to-end, multi-dimensional convolutions are required to obtain end-to-end delays. Because multi-dimensional convolutions are generally too computationally expensive and inaccurate to perform directly, Laplace transforms are used in their place. However, Laplace transforms require mathematically complicated transform inversion techniques making them undesirable for use in routine network planning situations.

SUMMARY OF THE INVENTION

According to one aspect of the invention, a method for estimating end-to-end transit delay in a network may use a variety of measured delay characteristics associated with domains spanning the network. The measured delay characteristics are used as inputs to a function which provides an estimation of delay. The function is not computationally complex, and thus accurate estimates of end-to-end delay may be obtained more quickly and therefore be made more useful in real-time network administration.

According to one aspect of the invention, a method for estimating end-to-end delay in a transmission network including a plurality of domains includes the steps of:

measuring, for each domain, the mean, the variance, and the third central moment of the distribution of delays across the domain, combining the domain means, variances, and the third moments by summing to produce the mean, variance, and third moment of end-to-end delay recovering (in approximate form) the end-to-end delay distribution by applying a function to the end-to-end mean, variance, and third central moment.

According to another aspect of the invention, a computer program product for use in estimating an end-to-end delay in a transmission network including a plurality of domains includes; program code for measuring, for each domain, the mean, variance, and third central moment of the distributions of delays across the domain; program code for combining these to produce the mean, variance, and third central moment of the end-to-end delay distribution; and program code for recovering (in approximate form) the end-to-end delay distribution from the end-to-end mean, variance, and third central moment.

According to a further aspect of the invention, an apparatus for estimating an end-to-end delay in a transmission network including a plurality of domains, the end-to-end delay for use in adjusting a characteristic of the transmission network, wherein this includes; means for measuring, for each domain, the mean, variance, and third central moment of the distribution of delays across the domain; means for combining these to produce the mean, variance, and third central moment of the end-to-end delay distribution; and means for recovering (in approximate form) the end-to-end delay distribution from the end-to-end mean, variance, and third central moment.

BRIEF DESCRIPTION OF THE FIGURES

FIGS. 2A-2C illustrate various embodiments of transform logic which may be used in the present invention, depending upon available measured delay characteristic information;

DETAILED DESCRIPTION

Figure 1:
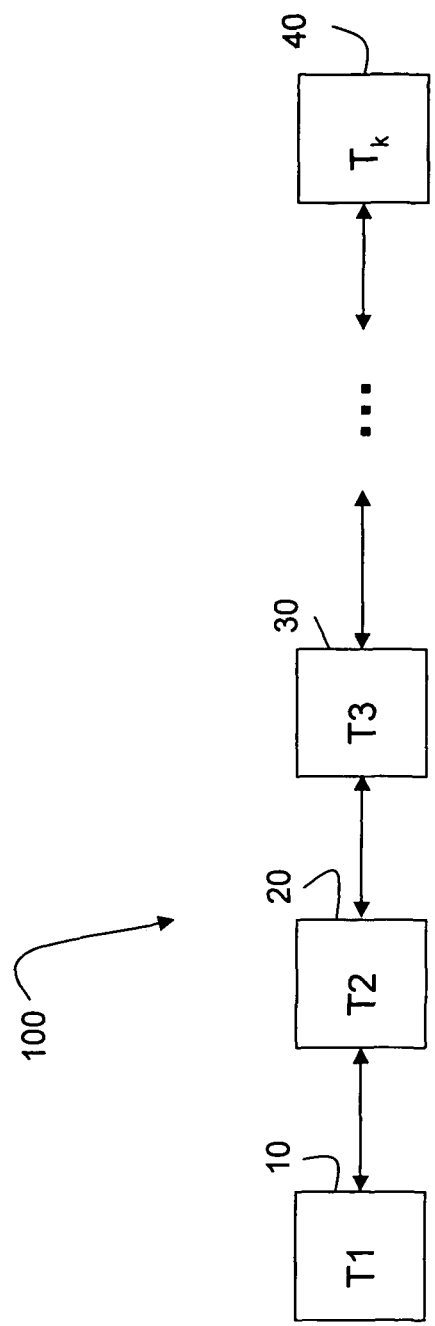
FIG. 1 is a block diagram illustrating several components in a network.

According to one aspect of the invention, a method and apparatus for estimating end-to-end packet delays between devices in a network is provided which uses measured values of component delays in an algorithm that approximates the end-to-end delay distribution.

In the below disclosure, the following variables and definitions will be used:

The term path will refer to a time sequenced flow of packets from a source emitting packets to a destination which receives them. The time sequence of emission is here taken to induce the natural (temporal) ordering of the packets. The flow itself can occur over any medium including, optical, wireline, or wireless media.

A path may comprise a number of segments that are traversed in sequence. Each segment is itself a path.

The term delay will refer to any of the following quantities:
   The temporal duration associated with a packet transiting a path determined as follows: if $t_0$ is the time of packet emission by the source and $t_1$ is the time of reception at the destination then the delay is the quantity $t_1-t_0$. The delay may also refer to any quantity $t_1-t_0-c$ where c is a constant value (c is often taken to ew3be the minimum of all possible delays for the path under discussion). Times are assumed measured with respect to a common reference clock and therefore directly comparable.
   The duration between successive packet receptions at the destination end of a path and determined as follows: if $t_0$ is the time of packet reception of a given packet and $t_1$ is the time of reception of the next packet in the natural packet ordering then the delay is the quantity $t_1-t_0$. The delay may also refer to any quantity $t_1-t_0-c$ where c is a constant value (c is normally taken to be the period of packet emission by the source associated with the path). This quantity is often called the delay variation or jitter associated with the pair of packet arrival times.

T represents the random delay of a path between a source and a destination according to the definition above. When there are n segments in the path, the end-to-end transit delay may be represented as the sum of all segment delays $T_k$, $1 \leq k \leq n$ within the path in the form shown in Equation I below:

$$T = \sum_{k=1}^{n} T_k \qquad \text{Equation I}$$

$\mu$ ($=E[T]$) represents the mean of the distribution of the delay T. $\mu_k(=E[T_k])$ represents the mean of the distribution of delay in the k-th segment.

$\sigma^2$ ($=E[T-\mu]^2$) represents the variance of the distribution of the delay T. $\sigma_k^2(=E[T_k-\mu_k]^2)$ represents the variance of delay for the k-th segment.

The standard normal distribution function $\Phi$ is the cumulative distribution function for a normal random variable with a mean of zero and a variance of one, that is $\Phi(t)=\int_\infty \exp(-x^2/2)dx/\sqrt{2\pi}$.

$\omega(=E[T-\mu]^3)$ represents the third central moment of the distribution of T. $\omega_k(=E[T_k-\mu_k]^3)$ represents the third central moment of delay for the k-th segment.

$\gamma$ represents the skewness of the distribution of T and is defined as Equation II below:

$$\gamma = \omega/\sigma^3 \qquad \text{Equation II:}$$

$\gamma_k=\omega_k/\sigma_k^3$ represents the skewness of the delay for the k-th segment. The third central moment can be recovered from the skewness and variance using Equation III below:

$$\omega = \gamma \cdot \sigma^3 \qquad \text{Equation III:}$$

$\omega_k=\gamma_k\cdot\sigma_k^3$ expresses the third central moment of the delay for the k-th segment in terms of the corresponding skewness and variance.

The p-th quantile of a random variable T with probability distribution function F is the value t satisfying $F(t)=p$. In the present invention, if T is a random variable representing a delay then the p-th quantile is the value t which satisfies the condition $T<t$ with probability p, that is $\Pr\{T<t\}=F(t)=p$. For example, if t=10 ms. and p=0.99 then with 99% probability the delay T is no greater than 10 ms. The p-th quantile $t_k$ is the value satisfying $\Pr(T_k<t_k)=p$ where $T_k$ is the random variable representing the transit delay for the k-th segment.

The p-th quantile of the standard normal distribution is the value t satisfying $\Phi(t)=p$ where $\Phi$ is the standard normal distribution function.

As will be described in more detail below, the present invention provides a method and apparatus for estimating a quantile of end-to-end delay for a path comprising a number of segments as follows:

1. For each segment delay $T_k$, $1 \leq k \leq n$, apply a well-defined algorithm to compute a finite number m of characterizing parameters $q_{k,1}, q_{k,2}, \ldots, q_{k,m}$ selected to have well-behaved compositional properties. These parameters contain enough information about the distribution of $T_k$ that a good approximation of the distribution can be constructed from knowledge of the parameter values alone.
2. Combine the n sets of segment parameters $q_{k,1}, q_{k,2}, \ldots, q_{k,m}, 1\leq k\leq n$ into a set of characterizing parameters $q_1, q_2, \ldots, q_m$ for the end-to-end delay T using an algorithm based their compositional properties.
3. Apply an algorithm that uses the characterizing parameters $q_1, q_2, \ldots, q_m$ to construct an approximation to the distribution of end-to-end delay T.

According to one aspect of the invention, the characterizing parameters employed above consist of the mean, variance, and third central moment or equivalently the skewness, or alternatively the p-th quantile of the distribution of each segment delay $T_k$. If quantiles are used, before proceeding to step 2 they are first converted to third central moments using a simple approximation algorithm. In step 2 the segment parameters are combined by simple addition to produce the mean, variance, and third central moment of the end-to-end delay distribution. In step 3 the end-to-end parameters are employed in a simple algorithm to approximate the distribution of end-to-end delay.

Referring now to FIG. 1, a network 100 includes multiple network components 10, 20, 30, and 40. For the purposes of this patent application, any of the components can be, for example, an individual network device (such as a router or switch) or multiple devices which may comprise their own individual network. Wireless, wireline or optical media may be employed in any combination. As such, delay data associated with the component 10, 20, etc., may include delay data for the individual device, or the total delay associated with a grouping of devices, including for example delay data provided by network administrators for a complete network under their management.

When evaluating the delay of transiting a path it is recognized that this delay is a random variable whose individual values can be represented as samples from a particular probability distribution.

The delay distribution of a given path can be obtained through direct measurement, for example by forwarding multiple packets from the source to the destination, and determining transit times for each packet. These measurements can be collected together into a histogram or can be approximated by an analytical distribution function once the analyst is satisfied that the selected distribution produces a suitable approximation. In some cases the individual delay measurements are summarized into characterizing parameters of the distribution such as the mean, variance, and third moment. As an alternative, for some segments (such as a third party network), the delay distribution parameters may be directly provided by the administrators of the component. Thus, any active or passive methods of obtaining delay distribution characteristics for a path or segment may be used in the present invention, and the invention is not limited to any particular method of measuring delays.

According to one aspect of the invention, the estimated end-to-end transit delay is expressed by the p-th quantile of delay for a given probability p. For example, selecting a probability of 0.99 one of the methods described below is employed to estimate the delay t which satisfies the condition Pr{T<t}=0.99. If it is found that t=10 ms. say, this condition states that any measured value T of the path delay will satisfy the inequality T <10 ms. with probability 0.99. Several alternative methods that may be used to estimate the transit delay depending upon available measured segment delay information will now be described with regard to FIGS. 2A-2C and 3A-3C.

FIG. 2A illustrates transform logic which receives as inputs a measured mean $\mu_k$, a measured variance $\sigma_k^2$, and a measured third central moment $\omega_k$ for segment k where $1 \leq k \leq n$. The transform logic also receives a probability p, which is used to determine the target quantile for the end-to-end delay estimation.

Figure 3A:
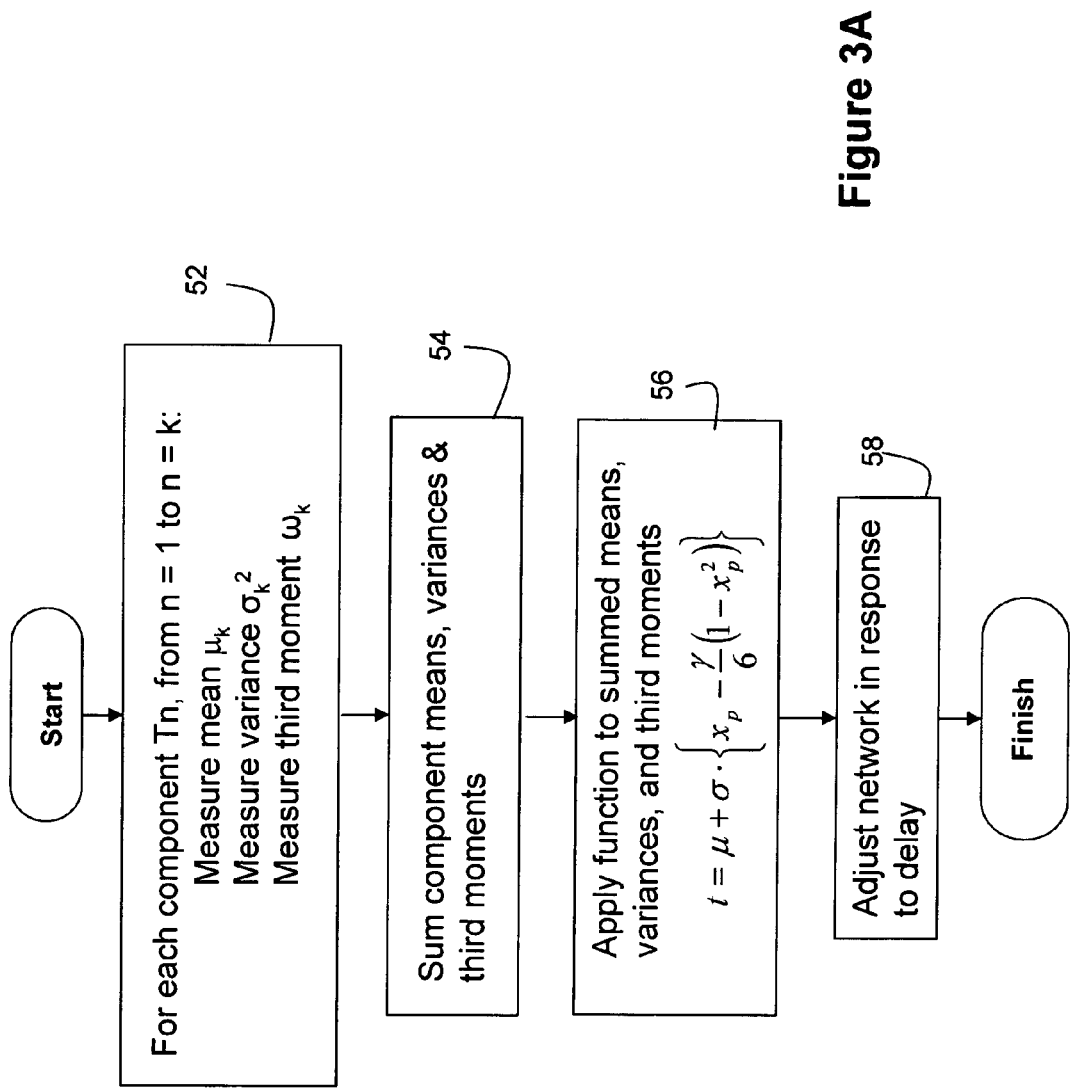
FIGS. 3A-3C are flow diagrams which correspond to respective transform logic embodiments 2A-2C, and illustrate several exemplary steps that may be performed when estimating the end-to-end transit delay of the network of FIG. 1.

FIG. 3A illustrates several steps that may be performed when identifying the transit delay t associated with the target quantile. At step 52, the mean, variance, and third central moment of delay for each segment $1 \leq k \leq n$ are measured. At step 54, assuming the independence of the delays for segments, the end-to-end mean $\mu$, variance $\sigma^2$ and third central moment $\omega$ are calculated as the sums of the corresponding values for the segments. Once the end-to-end variance and third moment are determined, the end-to-end skewness $\gamma$ can also be calculated, using the earlier equation II.

It should be noted that the skewness is employed here only for notational convenience since it is derived from the third central moment and variance and therefore adds no new information.

At step 56 the target p-th quantile t can be determined according to the below equation IV:

$$t = \mu + \sigma \cdot \{x_p - \frac{\gamma}{6}(1 - x_p^2)\} \quad \text{Equation IV}$$

where x, is the p-th quantile of the standard normal distribution, that is, the value satisfying $\Phi(x_p)=p$ where $\Phi$ denotes the standard normal (mean 0, variance 1) distribution function. It should be noted that this equation can also be expressed without the use of the skewness by using Equation II to replace the skewness with an expression involving the variance and third central moment.

At step 58, once the estimated end-to-end delay has been identified, this value can be used by the network administrator for remedial action (for example, changing the destination jitter buffer size or the delay associated with its operation).

An example of how Equation IV may be used to estimate end-to-end delay will now be described with reference to the below table. The table records delay distribution characteristics across three segments (also referred to hereinafter as domains), where, as mentioned above, the segments may be individual devices or may alternatively be combinations of devices or networks.

Measured mean, variances, and third central moments for each delay domain are stored in the table. Assuming mutual independence of the delays for the domains, the end-to-end mean, variance, and third moment are just the sums of the corresponding component statistics, and the sums are recorded as the end-to-end value in the bottom row of the table below. The skewness of the end-to-end delay is computed using Equation II above, as shown in the rightmost column (the skewness for each individual component is not needed for this example and its computation is not shown).

TABLE I

| Domain | Mean | Variance | Third Moment | Skewness |
|---|---|---|---|---|
| 1 | $\mu_1 = 1$ | $\sigma_1^2 = 0.5$ | $\omega_1 = 0.5$ | |
| 2 | $\mu_2 = 2$ | $\sigma_2^2 = 1.0$ | $\omega_2 = 1.0$ | |
| 3 | $\mu_3 = 3$ | $\sigma_3^2 = 1.5$ | $\omega_3 = 1.5$ | |
| End-to-End | $\mu = 6$ | $\sigma^2 = 3.0$ | $\omega = 3.0$ | $\gamma = \omega/\sigma^3 = 0.577$ |

The estimate of a target quantile, for example the 99-th percentile (p=0.99) of end-to-end delay proceeds as follows. If $x_p$ is the value satisfying $\Phi(x_p)=p$ where $\Phi$ denotes the standard normal (mean 0, variance 1) distribution function, then $x_{0.99}=2.326$ is the value satisfying $\Phi(x_{0.99})=0.99$ (tabulated values of this function are readily available to those of skill in the art and may be found for example in the "Handbook of Mathematical Functions" edited by M. Abramowitz & I. Stegun, available as a Dover reprint). Applying Equation IV above:

$$t = \mu + \sigma \cdot \{x_p - \frac{\gamma}{6}(1 - x_p^2)\}$$

$$t = 6 + \sqrt{3.0} \cdot \{2.326 - \frac{0.577}{6}(1 - 2.326^2)\}$$

$$t = 10.77$$

Therefore, with probability 0.99, the end-to-end delay T is less than (approximately) t=10.77 ms.

Referring back to FIG. 2B, an alternative method of estimating a selected quantile of delay will now be described. In this embodiment, the measured third central moment is unavailable; however, the quantile values for each individual domain are measured. The measuring of the quantile values for each domain can be accomplished by monitoring the behavior of multiple packets as they traverse the domain, sorting the associated transit delays and finding the delay that partitions the set into two parts of the same ratio as the probability value. Accuracy of the quantile measurement may be enhanced by increasing the number of packets in the sample set.

Figure 3B:
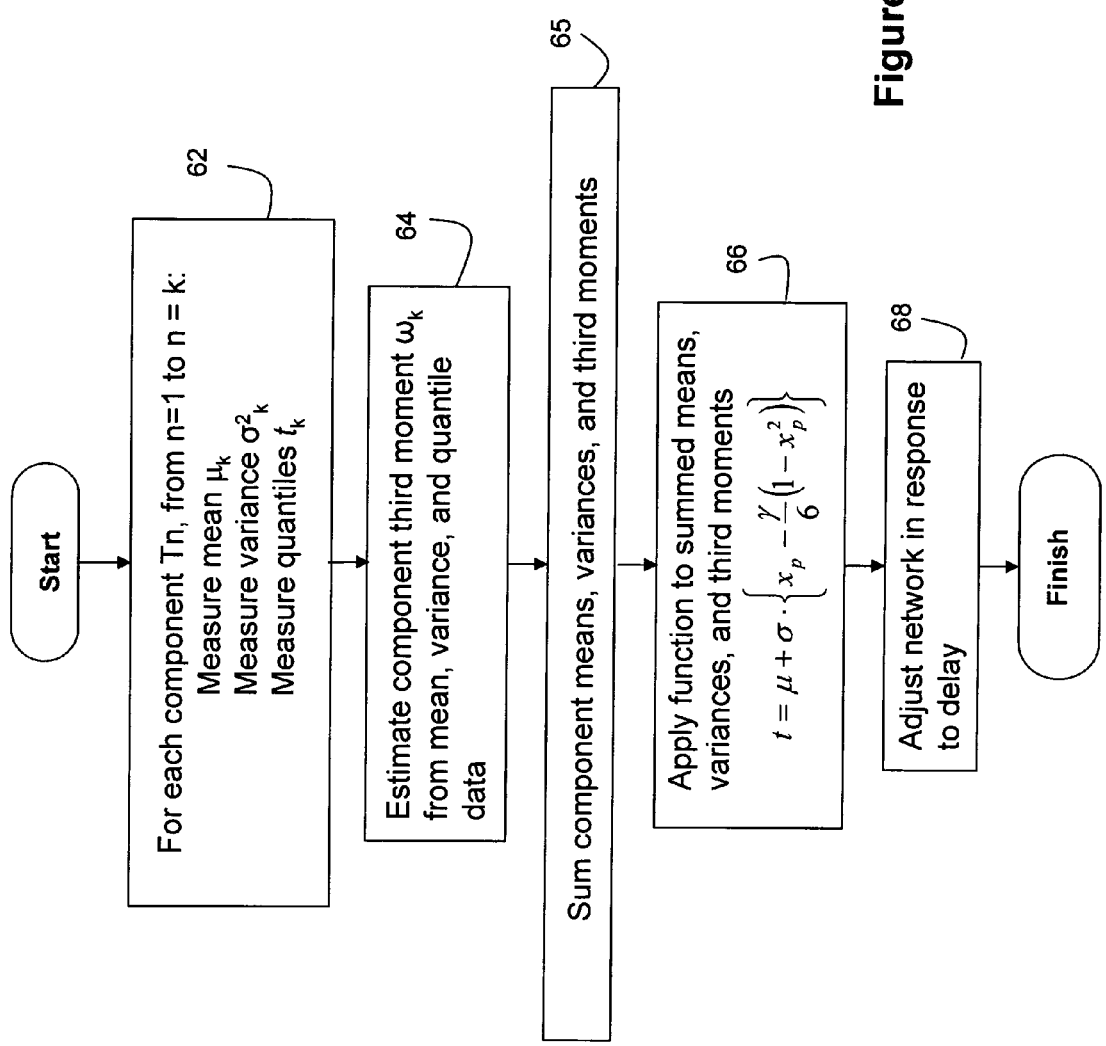

FIG. 3B illustrates several exemplary steps that may be performed when identifying the transit delay t associated with the target quantile. At step 62, the mean and variance delay characteristics for each domain $1 \leq k \leq n$ are measured. In addition, the quantiles $t_k$ for each delay domain are calculated for a desired probability (e.g., p=0.99). At step 64, the corresponding third moments for each domain are estimated based on the measured values, Equation III, and below Equation V:

$$\gamma_k = 6 \cdot \frac{x_p - \frac{t_k - \mu_k}{\sigma_k}}{1 - x_p^2} \quad \text{Equation V}$$

As before, the skewness is employed here for notational convenience and is not essential as Equations III and V can be combined to produce an expression for the third central moment in terms of measured means, variances, and quantiles without using the skewness.

At step 65, the characterizing parameters $(\mu_k, \sigma_k, \omega_k)$ for each domain are summed to obtain the end-to-end delay characteristics (μ, σ, ω) for the path. Once these values are obtained, Equation IV can be applied at step 66 to obtain the p-th quantile of delay t associated with the selected probability p. The total transit delay may then be used by a network administrator to take corrective or other appropriate action at step 68.

An example of how the transit delay t may be obtained when only measured mean, variance and quantile values may be obtained will now be described. As shown in Table II below, first the mean and variance for each delay component are measured. The end-to-end mean and variance can be obtained by summing the columns.

TABLE II

| Domain | Mean | Variance |
|---|---|---|
| 1 | $\mu_1 = 1.0$ | $\sigma_1^2 = 0.5$ |
| 2 | $\mu_2 = 2.0$ | $\sigma_2^2 = 1.0$ |
| 3 | $\mu_3 = 3.0$ | $\sigma_3^2 = 1.5$ |
| End-to-End | $\mu = 6.0$ | $\sigma^2 = 3.0$ |

Next, the quantiles are measured for each delay domain at the selected probability. For example, suppose that we select the 99-th percentile, and the following quantities in Table III are measured:

TABLE III

| Domain | Delay t |
|---|---|
| 1 | $t_1 = 3.32$ |
| 2 | $t_2 = 5.02$ |
| 3 | $t_3 = 6.55$ |

As mentioned above, the corresponding skewness and third moment for each domain can be estimated using Equations V and III (i.e., the formula shown at the top of the Table IV below). The estimations for this example are shown in Table IV.

TABLE IV

| Domain | Skewness | Third Moment |
|---|---|---|
|  | $\gamma_k = 6 \cdot \dfrac{x_p - \dfrac{t_k - \mu_k}{\sigma_k}}{1 - x_p^2}$ | $\omega_k = \gamma_k \cdot \sigma_k^3$ |
| 1 | $\gamma_1 = 6 \cdot \dfrac{2.326 - \dfrac{3.32 - 1}{\sqrt{0.5}}}{1 - (2.326)^2} = 1.297$ | $\omega_1 = \gamma_1 \cdot \sigma_1^3 = 0.459$ |
| 2 | $\gamma_2 = 6 \cdot \dfrac{2.326 - \dfrac{5.02 - 2}{\sqrt{1.0}}}{1 - (2.326)^2} = 0.947$ | $\omega_2 = \gamma_2 \cdot \sigma_2^3 = 0.947$ |
| 3 | $\gamma_3 = 6 \cdot \dfrac{2.326 - \dfrac{6.55 - 3}{\sqrt{1.5}}}{1 - (2.326)^2} = 0.783$ | $\omega_3 = \gamma_3 \cdot \sigma_3^3 = 1.438$ |
| End-to-End | $\gamma = \dfrac{\omega}{\sigma^3} = 0.547$ | $\omega = \omega_1 + \omega_1 + \omega_1 = 2.844$ |

In this example, $x_{0.99} = 2.326$ is the value satisfying $\Phi(x_{0.99}) = 0.99$ where $\Phi$ denotes the standard normal (mean 0, variance 1) distribution function. Assuming independence of the delay distributions for the domains, the third central moment of the end-to-end delay is just the sum of the domain third moments. The end-to-end skewness is computed by dividing by $\sigma^3$ as shown in the table. The estimate of the 99-th percentile (p=0.99) of end-to-end delay t can be obtained by applying Equation IV above as follows.

$$t = \mu + \sigma \cdot \left\{ x_p - \frac{\gamma}{6}(1 - x_p^2) \right\}$$

$$t = 6 + \sqrt{3.0} \cdot \left\{ 2.326 - \frac{0.547}{6}(1 - 2.326^2) \right\}$$

$$t = 10.73$$

Therefore, with probability 0.99, the end-to-end delay T is less than (approximately) t=10.73. It should be noted in the above, that with no loss of generality, the calculations can avoid using the skewness by eliminating it using Equation II.

Referring back to FIG. 2C, an alternative method of estimating end-to-end delay at a selected quantile will now be described. In this embodiment, both the measured third central moment and the measured quantile are available. One difference between this embodiment and those described with references to FIGS. 2A, 2B, 3A and 3B is that it does not directly use the standard normal probabilities in the approximation of the end-to-end delay distribution. Additionally, it is independent of the specific probability p (except that the value of p must be sufficiently high that the approximations used are valid).

Figure 3C:
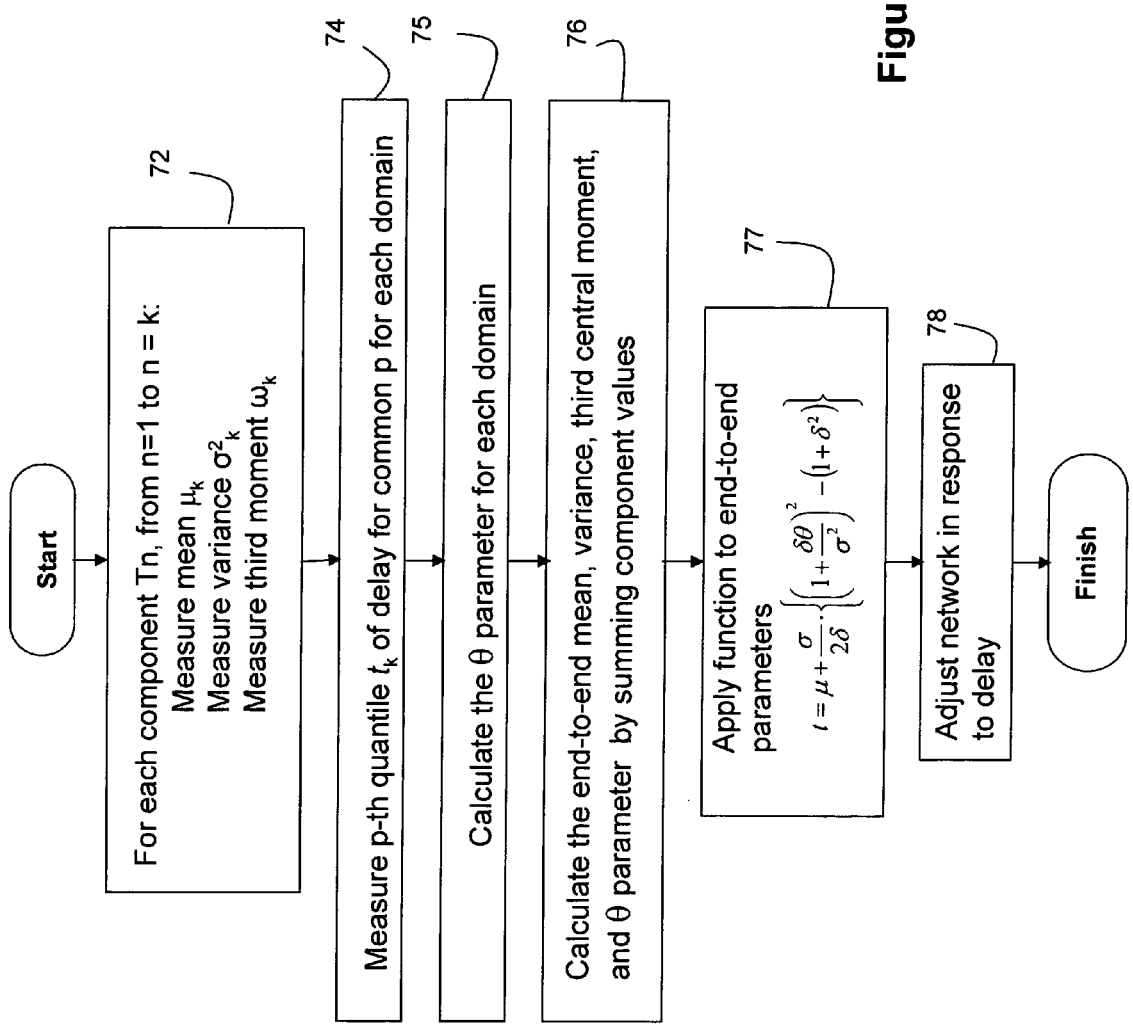

FIG. 3C illustrates several exemplary steps that may be performed when identifying the transit delay t associated with the target quantile. At step 72, the mean, variance, and third central moments are measured. At step 74 the p-th quantile of delay for each of the domains is measured for a common (across all domains) probability p. The skewness for each domain is calculated based on the measured values for each domain using Equation II above but it should be noted that this is only for notational convenience and is not essential.

Once the measured p-th quantile, the mean, variance, and central moments are obtained, at step 75 a new characterizing parameter denoted $\theta_k$ is calculated for each domain using below equation VI, where the definitions $\delta_k = \gamma_k/3$ are used to simplify the expressions. It should be noted that this new parameter has no conventional name or simple interpretation and will be called the θ parameter in what follows.

$$\theta_k = \sigma_k^2 \cdot \frac{\sqrt{1 + 2\delta_k \cdot \left( \frac{t_k - \mu_k}{\sigma_k} \right) + \delta_k^2} - 1}{\delta_k} \qquad \text{Equation VI}$$

Once these are calculated, in step 76 they are summed to produce an end-to-end θ parameter value. Similarly, summation is used to produce the end-to-end mean, variance, and third central moment.

These are used in step 77 in below Equation VII to provide the end-to-end estimated $99^{th}$ percentile of transit delay.

$$t = \mu + \frac{\sigma}{2\delta} \cdot \left\{ \left( 1 + \frac{\delta\theta}{\sigma^2} \right)^2 - (1 + \delta^2) \right\} \qquad \text{Equation VII}$$

The skewness γ employed in Equation VII is found from Equation II as applied to the end-to-end mean and variance. Additionally, the definition $\delta = \gamma/3$ is used to simplify the notation.

As before, an example of how the above method described with regard to FIG. 3C may be used to estimate end-to-end transit delay will now be provided. First the mean, variance, and third central moment are measured for each delay domain. Assuming independence of the domains, the end-to-end mean, variance, and third moment are just the sums of the corresponding domain statistics (add down the middle 3 columns of Table V below). The skewness for each component and end-to-end is computed from the third moments using Equation II as shown in the rightmost column.

TABLE V

| Domain | Mean | Variance | Third Moment | Skewness |
|---|---|---|---|---|
| 1 | $\mu_1 = 1$ | $\sigma_1^2 = 0.5$ | $\omega_1 = 0.5$ | $\gamma_1 = \omega_1/\sigma_1^3 = 1.414$ |
| 2 | $\mu_2 = 2$ | $\sigma_2^2 = 1.0$ | $\omega_2 = 1.0$ | $\gamma_2 = \omega_2/\sigma_2^3 = 1.0$ |
| 3 | $\mu_3 = 3$ | $\sigma_3^2 = 1.5$ | $\omega_3 = 1.5$ | $\gamma_3 = \omega_3/\sigma_3^3 = 0.817$ |
| End-to-End | $\mu = 6$ | $\sigma^2 = 3.0$ | $\omega = 3.0$ | $\gamma = \omega/\sigma^3 = 0.577$ |

In addition, the delay for a common quantile for each of the domains is measured as shown in Table VI. For example, suppose that the 99-th percentile (p=0.99) is selected, and that the following quantities are measured:

TABLE VI

| Domain | Delay t |
|---|---|
| 1 | $t_1 = 3.32$ |
| 2 | $t_2 = 5.02$ |
| 3 | $t_3 = 6.55$ |

The computation of the new parameter $\theta$ corresponding to the end-to-end delay distribution using Equation VI above is shown in Table VII below. The definitions $\delta_k = \gamma_k/3$ and $\delta = \gamma/3$ are used to simplify the expressions.

TABLE VII

| Domain | |
|---|---|
| | $\theta_k = \sigma_k^2 \cdot \dfrac{\sqrt{1 + 2\delta_k \cdot \left(\dfrac{t_k - \mu_k}{\sigma_k}\right) + \delta_k^2} - 1}{\delta_k}$ |
| 1 | $\theta_1 = 0.5 \cdot \dfrac{\sqrt{1 + 2\left(\dfrac{1.297}{3}\right)\cdot\left(\dfrac{3.32 - 1}{\sqrt{0.5}}\right) + \left(\dfrac{1.297}{3}\right)^2} - 1}{1.297/3} = 1.143$ |
| 2 | $\theta_2 = 1.0 \cdot \dfrac{\sqrt{1 + 2\left(\dfrac{0.947}{3}\right)\cdot\left(\dfrac{5.02 - 2}{\sqrt{1.0}}\right) + \left(\dfrac{0.947}{3}\right)^2} - 1}{0.947/3} = 2.304$ |
| 3 | $\theta_3 = 1.5 \cdot \dfrac{\sqrt{1 + 2\left(\dfrac{0.783}{3}\right)\cdot\left(\dfrac{6.55 - 3}{\sqrt{1.5}}\right) + \left(\dfrac{0.783}{3}\right)^2} - 1}{0.783/3} = 3.4674$ |
| End-to-End | $\theta = \theta_1 + \theta_2 + \theta_3 = 6.914$ |

The 99-th percentile of end-to-end delay t is computed using Equation VII as follows.

$$t = \mu + \frac{\sigma}{2\delta} \cdot \left\{ \left(1 + \frac{\delta\theta}{\sigma^2}\right)^2 - (1 + \delta^2) \right\}$$

-continued $$t = 6 + \frac{\sqrt{3}}{2 \cdot (0.577/3)} \cdot \left\{ \left(1 + \frac{(0.577/3) \cdot 6.914}{3}\right)^2 - (1 + (0.577/3)^2) \right\}$$

$$t = 10.71$$

Therefore, with probability 0.99, the end-to-end delay T is less than (approximately) t=10.71 ms.

Note that the estimates of the 99-th percentile of end-to-end delay produced by the computations in the first example (t=10.77) which is obtained using the method of FIG. 3A, second example (t=10.73) which is obtained using the method of FIG. 3B, and the present example (t=10.71) which is obtained using the method of FIG. 3C differ slightly but are all close to the exact value computed from convolution of the underlying distributions (t=10.75) for this example.

Accordingly, several methods for estimating an end-to-end delay in a transmission network have been described. The methods may use a variety of measured delay characteristics associated with domains spanning the network as inputs to a function which provides an estimation of delay. The function is not computationally complex, and thus accurate estimates of end to end delay may be obtained more quickly and therefore be made more useful in real-time network administration.

The above description and Figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software or a combination thereof.

FIGS. 3A-3C are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); and (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the system may be embodied using a variety of specific command structures. Accordingly, the invention should not be viewed as limited except by the scope and spirit of the appended claims.

What is claimed is:

1. A method comprising:
using a network component to estimate distribution of end-to-end delay for a path including a plurality of segments which are traversed in sequence in a transmission network which includes a plurality of interconnected network devices associated with a plurality of domains by:
measuring, for each of the segments of each domain in the path, a number of characterizing parameters of a distribution of delays consisting of the mean, the variance, and the third central moment of the distribution of delays across the domain, wherein the distribution includes individual delay contributions by individual ones of the segments of the path across the domain for each characterizing parameter;
for each domain characterizing parameter, summing the individual delay contributions into corresponding end-to-end characterizing parameters;
approximating end-to-end delay distribution using the end-to-end characterizing parameters, the distribution being indicative of delay variation probability; and
adjusting a characteristic of at least one of the network devices based on estimated distribution of end-to-end delay.

2. The method according to claim 1, wherein approximating the end-to-end delay distribution from the end-to-end characterizing parameters includes using the formula:

$$t = \mu + \sigma \cdot \{x_p - \frac{\gamma}{6}(1 - x_p^2)\}$$

where t is the estimated p-th quantile of the end-to-end transit delay for a given probability p, μ is the end-to-end mean, $\sigma^2$ is the end-to-end variance, ω is the end-to-end third central moment, $\gamma = \omega/\sigma^3$, and $x_p$ is the p-th quantile of the standard normal distribution.

3. The method according to claim 1, further including:
measuring, for the k-th domain, the characterizing parameters consisting of the mean $\mu_k$, the variance $\sigma_k^2$, and for a given probability p, the p-th quantile $t_k$ of the distribution of delays across the domain, and estimating the third central moment $\omega_k$ of the delay across the k-th domain of the multiple domains using the formulas $\omega_k = \gamma_k \cdot \sigma_k^3$ and $$\gamma_k = 6 \cdot \frac{x_p - \frac{t_k - \mu_k}{\sigma_k}}{1 - x_p^2}$$

where $x_p$ is the p-th quantile of the standard normal distribution;
combining the domain means, variances, and third central moments by summing to produce a set of characterizing parameters for the end-to-end delay distribution consisting of the mean, the variance, and the third central moment of the distribution of the end-to-end delay distribution;
approximating the end-to-end delay distribution from the end-to-end characterizing parameters.

4. The method according to claim 3, wherein approximating the end-to-end delay distribution from the end-to-end characterizing parameters includes using the formula:

$$t = \mu + \sigma \cdot \{x_p - \frac{\gamma}{6}(1 - x_p^2)\}$$

where t is the estimated p-th quantile of the end-to-end transit delay for a given probability p, μ is the end-to-end mean, $\sigma^2$ is the end-to-end variance, ω is the end-to-end third central moment, $\gamma = \omega/\sigma^3$, and $x_p$ is the p-th quantile of the standard normal distribution.

5. The method according to claim 1, further including:
measuring, for the k-th domain, the characterizing parameters consisting of the mean $\mu_k$, the variance $\sigma_k$, and the third central moment $\omega_k$, and for a common probability p across all domains, the p-th quantiles $t_k$ of the distribution of delays across the domains, and estimating the θ parameter of the delay across the k-th domain of the multiple domains using the formula $$\theta_k = \sigma_k \cdot \frac{\sqrt{1 + 2\delta_k\left(\frac{t_k - \mu_k}{\sigma_k}\right) + \delta_k^2} - 1}{\delta_k}$$

where $\delta_k = \omega_k \cdot \sigma_k^3/3$;
combining the domain means, variances, third central moments, and θ parameters by summing to produce a set of characterizing parameters for the end-to-end delay distribution consisting of the end-to-end mean, variance, third central moment, and θ parameter;
constructing an approximation to the end-to-end delay distribution using the function:

$$t = \mu + \frac{\sigma}{2\delta} \cdot \left\{\left(1 + \frac{\delta\theta}{\sigma^2}\right)^2 - (1 + \delta^2)\right\}$$

where t is the estimated p-th quantile of the end-to-end transit delay for the common probability p, μ is the mean, $\sigma^2$ is the variance, ω is the third central moment of the end-to-end delay distribution, and $\delta = \omega \cdot \sigma^3/3$.

6. An apparatus for estimating the distribution of end-to-end delay for a path including a plurality of segments which are traversed in sequence in a transmission network including a plurality of domains, the end-to-end delay for use in adjusting a characteristic of the transmission network or otherwise administering the network, comprising:

means for measuring, for each of the segments of each domain in the path, a number of characterizing parameters of a distribution of delays consisting of the mean, the variance, and the third central moment of the distribution of delays across the domain, wherein the distribution includes individual delay contributions by individual ones of the segments of the path across the domain for each characterizing parameter;

means, for each domain characterizing parameter, for summing the individual delay contributions into corresponding end-to-end characterizing parameters;

means for approximating end-to-end delay distribution from the end-to-end characterizing parameters, the distribution being indicative of delay variation probability; and means for outputting a representation of the distribution in tangible form.

7. The apparatus according to claim 6, further including, means for approximating the end-to-end delay distribution from the end-to-end characterizing parameters using the formula:

$$t = \mu + \sigma \cdot \{x_p - \frac{\gamma}{6}(1 - x_p^2)\}$$

where t is the estimated p-th quantile of the end-to-end transit delay for a given probability p, $\mu$ is the end-to-end mean, $\sigma^2$ is the end-to-end variance, $\omega$ is the end-to-end third central moment, $\gamma=\omega/\sigma^3$, and $x_p$ is the p-th quantile of the standard normal distribution.

8. The apparatus according to claim 6, further including means for:

measuring, for the k-th domain, the characterizing parameters consisting of the mean $\mu_k$, the variance $\sigma_k^2$, and for a given probability p, the p-th quantile $t_k$ of the distribution of delays across the domain, and estimating the third central moment $\omega_k$ of the delay across the k-th domain of the multiple domains using the formulas $\omega_k = \gamma_k \cdot \sigma_k^3$ and $$\gamma_k = 6 \cdot \frac{x_p - \frac{t_k - \mu_k}{\sigma_k}}{1 - x_p^2}$$

where $x_p$ is the p-th quantile of the standard normal distribution;

combining the domain means, variances, and third central moments by summing to produce a set of characterizing parameters for the end-to-end delay distribution consisting of the mean, the variance, and the third central moment of the distribution of the end-to-end delay distribution;

approximating the end-to-end delay distribution using the end-to-end characterizing parameters.

9. The apparatus according to claim 8, further including means for approximating the end-to-end delay distribution from the end-to-end characterizing parameters using the formula:

$$t = \mu + \sigma \cdot \{x_p - \frac{\gamma}{6}(1 - x_p^2)\}$$

where t is the estimated p-th quantile of the end-to-end transit delay for a given probability p, $\mu$ is the end-to-end mean, $\sigma^2$ is the end-to-end variance, $\omega$ is the end-to-end third central moment, $\gamma=\omega/\sigma^3$, and $x_p$ is the p-th quantile of the standard normal distribution.

10. The apparatus according to claim 6, further providing means for:

measuring, for the k-th domain, the characterizing parameters consisting of the mean $\mu_k$, the variance $\sigma_k$, and the third central moment $\omega_k$, and for a common probability p across all domains, the p-th quantiles $t_k$ of the distribution of delays across the domains, and estimating the $\theta$ parameter of the delay across the k-th domain of the multiple domains using the formula $$\theta_k = \sigma_k \cdot \frac{\sqrt{1 + 2\delta_k\left(\frac{t_k - \mu_k}{\sigma_k}\right) + \delta_k^2} - 1}{\delta_k}$$

where $\delta_k = \omega_k \cdot \sigma_k^3 / 3$;

combining the domain means, variances, third central moment, and $\theta$ parameters by summing to produce a set of characterizing parameters for the end-to-end delay distribution consisting of the end-to-end mean, variance, third central moment, and $\theta$ parameter;

constructing an approximation to the end-to-end delay distribution using the function:

$$t = \mu + \frac{\sigma}{2\delta} \cdot \left\{\left(1 + \frac{\delta\theta}{\sigma^2}\right)^2 - (1 + \delta^2)\right\}$$

where t is the estimated p-th quantile of the end-to-end transit delay for the common probability p, $\mu$ is the mean, $\sigma^2$ is the variance, w is the third central moment of the end-to-end delay distribution, and $\delta=\omega\cdot\sigma^3/3$.

11. A non-transitory computer readable medium containing computer executable instructions of a computer program product for estimating the distribution of end-to-end delay for a path including a plurality of segments which are traversed in sequence in a transmission network including a plurality of domains, the end-to-end delay for use in adjusting a characteristic of the transmission network or otherwise administering the network, comprising:

computer code which measures, for each of the segments of each domain, a number of characterizing parameters of a distribution of delays consisting of the mean, the variance, and the third central moment of the distribution of delays across the domain, wherein the distribution includes individual delay contributions by individual ones of the segments of the path across the domain for each characterizing parameter;

computer code which, for each domain characterizing parameter, sums the individual delay contributions into corresponding characterizing parameters;

computer code which approximates end-to-end delay distribution from the end-to-end characterizing parameters, the distribution being indicative of delay variation probability; and computer code which outputs a representation of the distribution in tangible form.

12. The non-transitory computer readable medium containing computer executable instructions of a computer program product according to claim 11, further including, computer code for approximating the end-to-end delay distribution from the end-to-end characterizing parameters using the formula:

$$t = \mu + \sigma \cdot \{x_p - \frac{\gamma}{6}(1 - x_p^2)\}$$

where t is the estimated p-th quantile of the end-to-end transit delay for a given probability p, $\mu$ is the end-to-end mean, $\sigma^2$ is the end-to-end variance, $\omega$ is the end-to-end third central moment, $\gamma = \omega/\sigma^3$, and $x_p$ is the p-th quantile of the standard normal distribution.

13. The non-transitory computer readable medium containing computer executable instructions of a computer program product according to claim 11, further including computer code for:
measuring, for the k-th domain, the characterizing parameters consisting of the mean $\mu_k$, the variance $\sigma_k^2$, and for a given probability p, the p-th quantile $t_k$ of the distribution of delays across the domain, and estimating the third central moment $\omega_k$ of the delay across the k-th domain of the multiple domains using the formulas $\omega_k = \gamma_k \cdot \sigma_k^3$ and $$\gamma_k = 6 \cdot \frac{x_p - \frac{t_k - \mu_k}{\sigma_k}}{1 - x_p^2}$$

where $x_p$ is the p-th quantile of the standard normal distribution;
combining the domain means, variances, and third central moments by summing to produce a set of characterizing parameters for the end-to-end delay distribution consisting of the mean, the variance, and the third central moment of the distribution of the end-to-end delay distribution;
approximating the end-to-end delay distribution using the end-to-end characterizing parameters.

14. The non-transitory computer readable medium containing computer executable instructions of a computer program product according to claim 13, further including computer code for approximating the end-to-end delay distribution from the end-to-end characterizing parameters using the formula:

$$t = \mu + \sigma \cdot \{x_p - \frac{\gamma}{6}(1 - x_p^2)\}$$

where t is the estimated p-th quantile of the end-to-end transit delay for a given probability p, $\mu$ is the end-to-end mean, $\sigma^2$ is the end-to-end variance, $\omega$ is the end-to-end third central moment, $\gamma = \omega/\sigma^3$, and $x_p$ is p-th quantile of the standard normal distribution.

15. The non-transitory computer readable medium containing computer executable instructions of a computer program product according to claim 11, further providing computer code for:
measuring, for the k-th domain, the characterizing parameters consisting of the mean $\mu_k$, the variance $\sigma_k$, and the third central moment $\omega_k$, and for a common probability p across all domains, the p-th quantiles $t_k$ of the distribution of delays across the domains, and estimating the $\theta$ parameter of the delay across the k-th domain of the multiple domains using the formula $$\theta_k = \sigma_k \cdot \frac{\sqrt{1 + 2\delta_k\left(\frac{t_k - \mu_k}{\sigma_k}\right) + \delta_k^2} - 1}{\delta_k}$$

where $\delta_k = \omega_k \cdot \sigma_k^3/3$;
combining the domain means, variances, third central moment, and $\theta$ parameters by summing to produce a set of characterizing parameters for the end-to-end delay distribution consisting of the end-to-end mean, variance, third central moment, and $\theta$ parameter;
approximating the end-to-end delay distribution using the function:

$$t = \mu + \frac{\sigma}{2\delta} \cdot \left\{\left(1 + \frac{\delta\theta}{\sigma^2}\right)^2 - (1 + \delta^2)\right\}$$

where t is the estimated p-th quantile of the end-to-end transit delay for the common probability p, $\mu$ is the mean, $\sigma^2$ is the variance, w is the third central moment of the end-to-end delay distribution, and $\delta = \omega \cdot \sigma^3/3$.

* * * * *